United States Patent [19]
Iyoda

[11] Patent Number: 5,577,476
[45] Date of Patent: Nov. 26, 1996

[54] IGNITION TIMING CONTROL APPARATUS FOR ENGINE

[75] Inventor: Hisao Iyoda, Okazaki, Japan

[73] Assignee: Toyota Jidosha Kabushiki Kaisha, Aichi-ken, Japan

[21] Appl. No.: 561,451

[22] Filed: Nov. 21, 1995

[30] Foreign Application Priority Data

Nov. 29, 1994 [JP] Japan ..................... 6-295291

[51] Int. Cl.$^6$ ......................................... F02P 5/14
[52] U.S. Cl. .............................................. 123/425
[58] Field of Search .................... 123/425, 478, 123/436, 414, 419, 421, 698, 699, 704; 364/431.08, 431.05, 424.1, 431.01, 431.07, 558, 571.01, 431.04; 73/116, 35.03, 112, 117.3, 115, 118.2

[56] References Cited

U.S. PATENT DOCUMENTS

| | | | |
|---|---|---|---|
| 5,276,625 | 1/1994 | Nakaniwa | 364/431.08 |
| 5,278,760 | 1/1994 | Ribbens et al. | 364/424.1 |
| 5,287,836 | 2/1994 | Shimasaki et al. | 123/406 |
| 5,327,868 | 7/1994 | Witkowski et al. | 123/421 |
| 5,411,000 | 5/1995 | Miyashita et al. | 123/425 |
| 5,421,304 | 6/1995 | Gibtner et al. | 123/425 |
| 5,447,136 | 9/1995 | Hartmann et al. | 123/425 |
| 5,460,031 | 10/1995 | Fujishita et al. | 73/35.03 |
| 5,508,927 | 4/1996 | Remboski, Jr. et al. | 364/431.08 |
| 5,515,280 | 5/1996 | Suzuki | 364/431.05 |

FOREIGN PATENT DOCUMENTS

| | | | |
|---|---|---|---|
| 54-109529 | 8/1979 | Japan | 123/425 |
| 59-221467 | 12/1984 | Japan | 123/425 |
| 62-78480 | 4/1987 | Japan | 123/425 |
| 62-24627 | 5/1987 | Japan | 123/425 |
| 63-80075 | 4/1988 | Japan | 123/425 |
| 63-117171 | 5/1988 | Japan | 123/425 |
| 3-194167 | 8/1991 | Japan | 123/425 |
| 3-242464 | 10/1991 | Japan | 123/425 |
| 4-43864 | 2/1992 | Japan . | |
| 5-332186 | 12/1993 | Japan | 123/425 |

OTHER PUBLICATIONS

English language abstract of Japanese Unexamined Patent Publication No. 54–109529.
English language abstract of Japanese Unexamined Patent Publication No. 62–78480.
English language abstract of Japanese Unexamined Patent Publication No. 63–80075.
English language abstract of Japanese Unexamined Patent Publication No. 63–117171.
English language abstract of Japanese Unexamined Patent Publication No. 3–194167.
English language abstract of Japanese Unexamined Patent Publication No. 3–242464.
English language abstract of Japanese Unexamined Patent Publication No. 4–43864.
English language abstract of Japanese Unexamined Patent Publication No. 5–332186.

*Primary Examiner*—Raymond A. Nelli
*Attorney, Agent, or Firm*—Oliff & Berridge

[57] ABSTRACT

An ignition timing control apparatus for an engine, which corrects the ignition timing in accordance with the presence/absence of exhaust gas to be recirculated into a combustion chamber by an exhaust gas recirculation (EGR) apparatus is described. An electronic control unit (ECU) controls the EGR apparatus in accordance with the running condition of the engine to control the EGR amount. The ECU computes a base ignition timing in accordance with the running condition of the engine and corrects the computed value toward advancement by a predetermined value in accordance with the EGR amount. Further, the ECU corrects the compensated value of the ignition timing by a predetermined value toward retard to the timing close to the limit beyond which knocking starts. Furthermore, the ECU limits the retard angle value within the range of the maximum value which is computed in accordance with the engine's running condition, and changes the retard angle value or the maximum value in accordance with the EGR amount. Based on the value of the final target ignition timing computed in the above manner, the ECU controls an igniter to control the actual ignition timing to the proper timing.

18 Claims, 8 Drawing Sheets

IGNITION TIMING CONTROL APPARATUS FOR ENGINE

BACKGROUND OF THE INVENTION

1. Field of the Invention

The present invention relates generally to an ignition timing control apparatus for a spark ignition type engine, which controls the ignition timing of an air-fuel mixture in the combustion chamber in accordance with the running condition of the engine. More particularly, this invention relates to an ignition timing control apparatus for an engine, that corrects the ignition timing in accordance with the presence or absence of exhaust gas that is discharged from the combustion chamber and is recirculated to the combustion chamber by an exhaust gas recirculation (EGR) apparatus.

2. Description of the Related Art

The ignition timing of the air-fuel mixture in spark ignition type engines is one of the factors that greatly affects emissions, fuel economy, driving characteristics and the like. It is therefore necessary to optimally control the ignition timing in accordance with the running condition of the engine. A known apparatus that performs such control is equipped with a computer. This computer computes the value of the optimal ignition timing in accordance with the engine running condition and activates the ignition plugs based on the computed value. When the engine is under normal (steady) operation, the computer in this type of control apparatus selects the value of the optimal ignition timing from previously stored values based on the engine speed and the load of the engine.

There is an exhaust gas recirculation (EGR) apparatus provided in the engine. This EGR apparatus recirculates part of the exhaust gas, which is discharged from the combustion chamber of the engine, into the air-fuel mixture that is to be drawn into the combustion chamber. When this exhaust gas enters the combustion chamber and the inactive gas in the exhaust gas acts on the burning air-fuel mixture, the combustion temperature of the air-fuel mixture falls. As a result, the amount of nitrogen oxide ($NO_x$) in the exhaust gas decreases.

When the amount of the exhaust gas to be recirculated by the EGR apparatus or the EGR amount increases, the propagation of burning of the air-fuel mixture in the combustion chamber is apt to slow. It is therefore necessary to advance the value of the ignition timing in accordance with the increase in EGR amount in an engine equipped with the EGR apparatus. Japanese Unexamined Patent Publication No. Sho 59-221467 discloses an apparatus which controls the ignition timing in association with a change in EGR amount. (This apparatus will be hereinafter referred to as "first prior art".) At the time the EGR apparatus recirculates the exhaust gas into the combustion chamber, this type of control apparatus adds the advance angle value, determined in accordance with the EGR amount, to a reference value (base value) of the ignition timing, which is used when the exhaust gas is not recirculated. Consequently, the ignition timing value to be finally transmitted is computed.

There is another type of ignition timing control apparatus which controls the ignition timing to the vicinity of the timing at which knocking starts in order to obtain the maximum output torque from the engine. This type of control apparatus has a knock sensor which detects the vibration of the engine. Based on the value detected by the knock sensor, the computer determines if knocking has occurred. The computer retards the ignition timing by a desired amount based on the result of the determination. If the maximum retard angle is set to be always constant regardless of the running condition of the engine, however, this control apparatus may set the retard angle value to a very large value when the engine runs in a high-load condition. In this case, the temperature of the exhaust gas is likely to increase rapidly.

Japanese Patent Publication No. Sho 62-24627 discloses an ignition timing control apparatus which overcomes the above problem (hereinafter referred to as "second prior art"). When determining that knocking has occurred in the engine, this control apparatus controls the ignition timing, which is determined in accordance with the running condition of the engine, in such a way as to retard the ignition timing to near the limit beyond which knocking starts. This control apparatus determines the maximum value of the retard angle in accordance with the engine speed and the load of the engine. Further, the control apparatus limits the change in retard angle to a value no greater than the determined maximum value.

When the control apparatus according to the second prior art is adapted for an EGR apparatus, the ignition timing should be corrected in accordance with the EGR amount as in the case of the control apparatus according to the first prior art. In this case, however, the control apparatus adds the advance angle value according to the EGR amount to the base value of the ignition timing at the time the exhaust gas is recirculated by the EGR apparatus. Further, the control apparatus determines the maximum retard angle with respect to the result of the addition. Therefore, knocking is more likely to occur due to the rise of the temperature of the air-fuel mixture due to the recirculated exhaust gas. Therefore the maximum value of the retard angle should be large. Nevertheless, the maximum value of the retard angle is reduced. Consequently, the value of the ignition timing, which is limited based on the maximum value of the retard angle, may be too far advanced, and thus, knocking is likely to occur.

SUMMARY OF THE INVENTION

Accordingly, it is a primary objective of the present invention to provide an ignition timing control apparatus that is designed on the premise that the maximum output torque is achieved from the engine by retarding the ignition timing to the vicinity of the limit where knocking starts. This invention aims at providing an ignition timing control apparatus capable of preventing the occurrence of unnecessary knocking by prohibiting the ignition timing from being to far advanced irrespective of whether or not the exhaust gas is recirculated to the combustion chamber.

To achieve the foregoing and other objects and in accordance with the purpose of the present invention, an apparatus for controlling an ignition timing in a internal combustion engine is provided. The apparatus has a first device for igniting a combustible mixture introduced to a combustion chamber through an intake passage at an ignition timing selected in response to operation conditions of the engine and a second device capable of recirculating exhaust gas exhausted from the combustion chamber to an exhaust passage back to the mixture. The apparatus corrects the ignition timing when the exhaust gas is recycled to the mixture. The apparatus comprises a first detecting device for detecting the operation conditions including at least an rotational speed of the engine and an operation load of the engine, a first computing device for computing the ignition timing based on the detected operation conditions, a first correcting device for correcting the computed ignition timing with an advance value in accordance with an occurrence of the recirculating of the exhaust gas, a second detecting device for detecting an occurrence of a knocking in the combustion chamber, a second correcting device for correcting the ignition timing corrected by the first correcting device with a specific retard value to a timing close to a limit beyond which the knocking starts, a control device for controlling the first device based on the ignition timing corrected by the second correcting device, a second computing device for computing a maximum retard value employed for the correction of the second correcting device based on the detected operation conditions. The apparatus further includes a confining device for confining the ignition timing corrected by the second correcting device within a limit of the computed maximum retard value, and varying device for varying one of the specific retard value employed in the correction of the second correcting device and the maximum retard value computed by the second computing device in accordance with the occurrence of the recirculating of the exhaust gas.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

DETAILED DESCRIPTION OF THE PREFERRED EMBODIMENT

An ignition timing control apparatus for an engine according to one embodiment of the present invention will now be described in detail with reference to the accompanying drawings.

Figure 1:
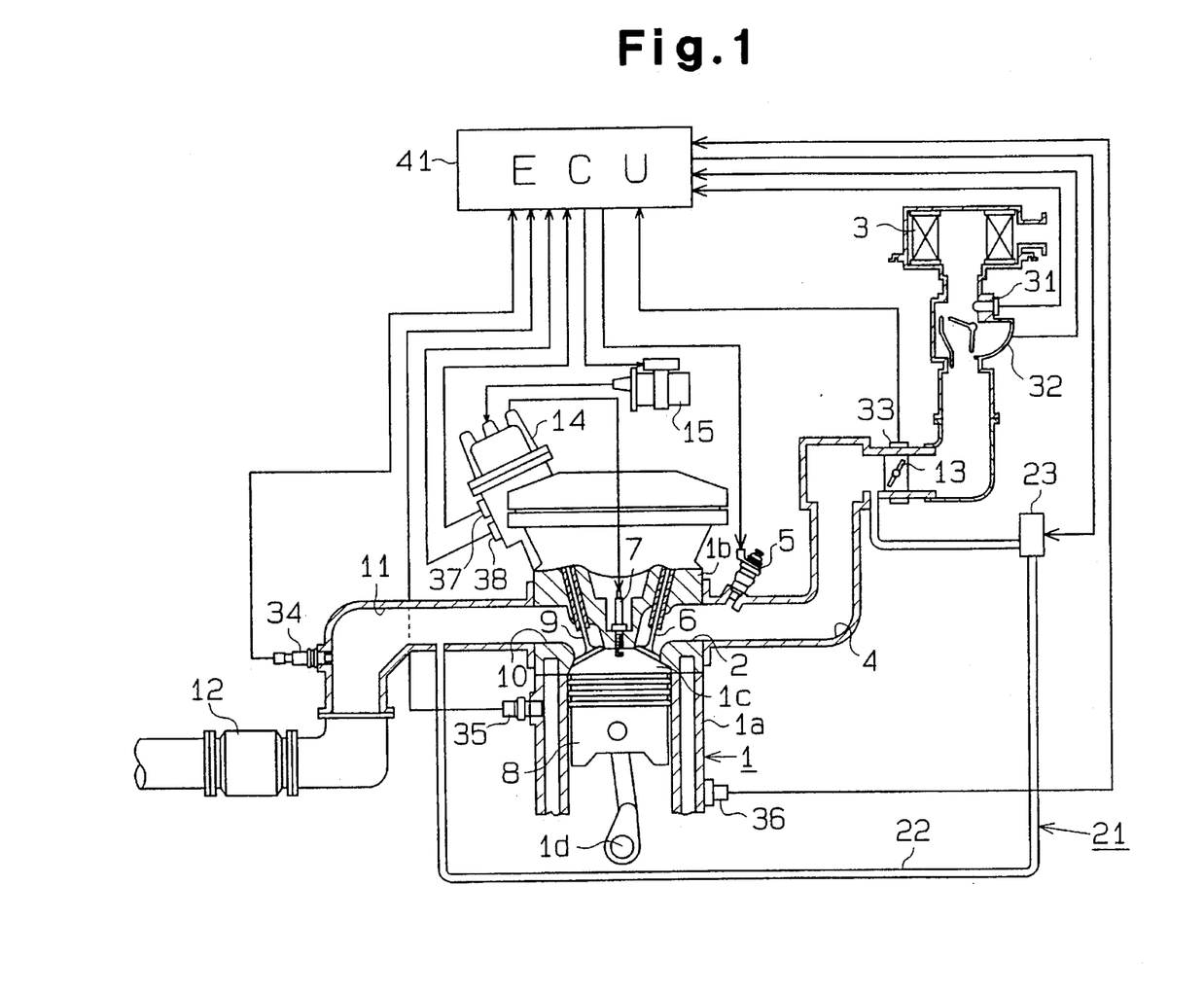
FIG. 1 is a schematic structural diagram illustrating a gasoline engine system embodying this invention.

FIG. 1 presents a schematic structural diagram showing a spark ignition type gasoline engine system. An engine 1 includes a cylinder block 1a and a cylinder head 1b. The block 1a has a plurality of cylinders (four in this embodiment) each including a combustion chamber 1c. Outside air drawn into an intake passage 4 from an air cleaner 3 flows through an intake port 2 provided for each cylinder. An injector 5 provided for each cylinder injects fuel to the associated intake port 2. The mixture of the air and fuel is supplied into the combustion chamber 1c when the intake port 2 is opened by an intake valve 6 provided for each cylinder. As an ignition plug 7 provided for each cylinder is activated, the air-fuel mixture is burned in the combustion chamber 1c. Consequently, pistons 8 move to rotate a crank shaft 1d. When an exhaust port 10 is opened thereafter by an associated exhaust valve 9, provided for each cylinder, the combusted gas is supplied as the exhaust gas to an exhaust passage 11 from the combustion chamber 1c. This exhaust gas is discharged outside after being purified by a catalyst 12.

A throttle valve 13 disposed in the intake passage 4 is activated in response to the manipulation of an acceleration pedal (not shown) to selectively open or close the intake passage 4. The throttle valve 13 serves to adjust the amount of intake air Q into the intake passage 4.

An Exhaust Gas Recirculation (EGR) apparatus 21 includes an EGR passage 22 and an EGR valve 23 provided in the passage 22. The EGR passage 22 connects the intake passage 4, located downstream the throttle valve 13, to the exhaust passage 11. The EGR valve 23 includes a valve seat, a valve body and a step motor (none shown). As the step motor intermittently changes the valve body with respect to the valve seat, the degree of opening of the EGR valve 23 changes. When the EGR valve 23 is open, part of the exhaust gas, discharged to the exhaust passage 11 from the associated combustion chamber 1c, flows into the EGR passage 22. This exhaust gas flows into the intake passage 4 via the EGR valve 23. That is, the EGR apparatus 21 recirculates part of the exhaust gas into the air-fuel mixture that is drawn into the combustion chamber 1c. At this time, the amount of recirculation of the exhaust gas (EGR amount) is adjusted by controlling the angle of the EGR valve 23.

An air temperature sensor 31 provided near the air cleaner 3 detects the temperature THA of the air drawn into the intake passage 4 (intake air temperature), and outputs a signal according to that temperature. An air-flow meter 32 also provided near the air cleaner 3 detects the intake air amount Q in the intake passage 4, and outputs a signal according to that amount. A throttle sensor 33 disposed close to the throttle valve 13 detects the angle of the valve 13 (throttle angle) TA and outputs a signal according to that angle. This sensor 33 incorporates a idle switch (not shown). When the throttle valve 13 is fully closed, this idle switch is set "ON", outputting an idle signal IDL indicating the fully closed state.

An oxygen sensor 34 disposed in the exhaust passage 11 detects the density of oxygen, $O_x$, remaining in the exhaust gas and outputs a signal according to that density. A coolant temperature sensor 35 provided on the cylinder block 1a detects the temperature THW of the coolant (coolant temperature) which flows to cool the block 1a, and outputs a signal according to that temperature. A knock sensor 36 provided on the cylinder block 1a detects the vibration including the knocking which occurs in the engine 1, and outputs a knock signal KCS according to that vibration.

A distributor 14 distributes ignition signals to be applied to the individual ignition plugs 7. An igniter 15 outputs a high voltage to the distributor 14 in synchronism with a change in the rotational angle of the crank shaft 1d (crank angle). The ignition timing of each ignition plug 7 is determined by the output timing of the high voltage from the igniter 15. The ignition apparatus according to this embodiment includes the individual ignition plugs 7 and the igniter 15.

An engine speed sensor 37 provided in the distributor 14 detects the rotational speed NE of the crank shaft 1d (engine speed) based on the rotational of the rotor (not shown) incorporated in the distributor 14, and outputs a signal according to that speed. A reference timing sensor 38 also provided in the distributor 14 detects a change in the reference timing of the crank angle by a predetermined ratio based on the rotation of the rotor, and outputs a signal according to that change.

An electronic control unit (ECU) 41 receives signals sent from those various sensors 31 to 38. Based on those input signals, the ECU 41 controls the individual injectors 5, the igniter 15 and the EGR valve 23.

Figure 2:
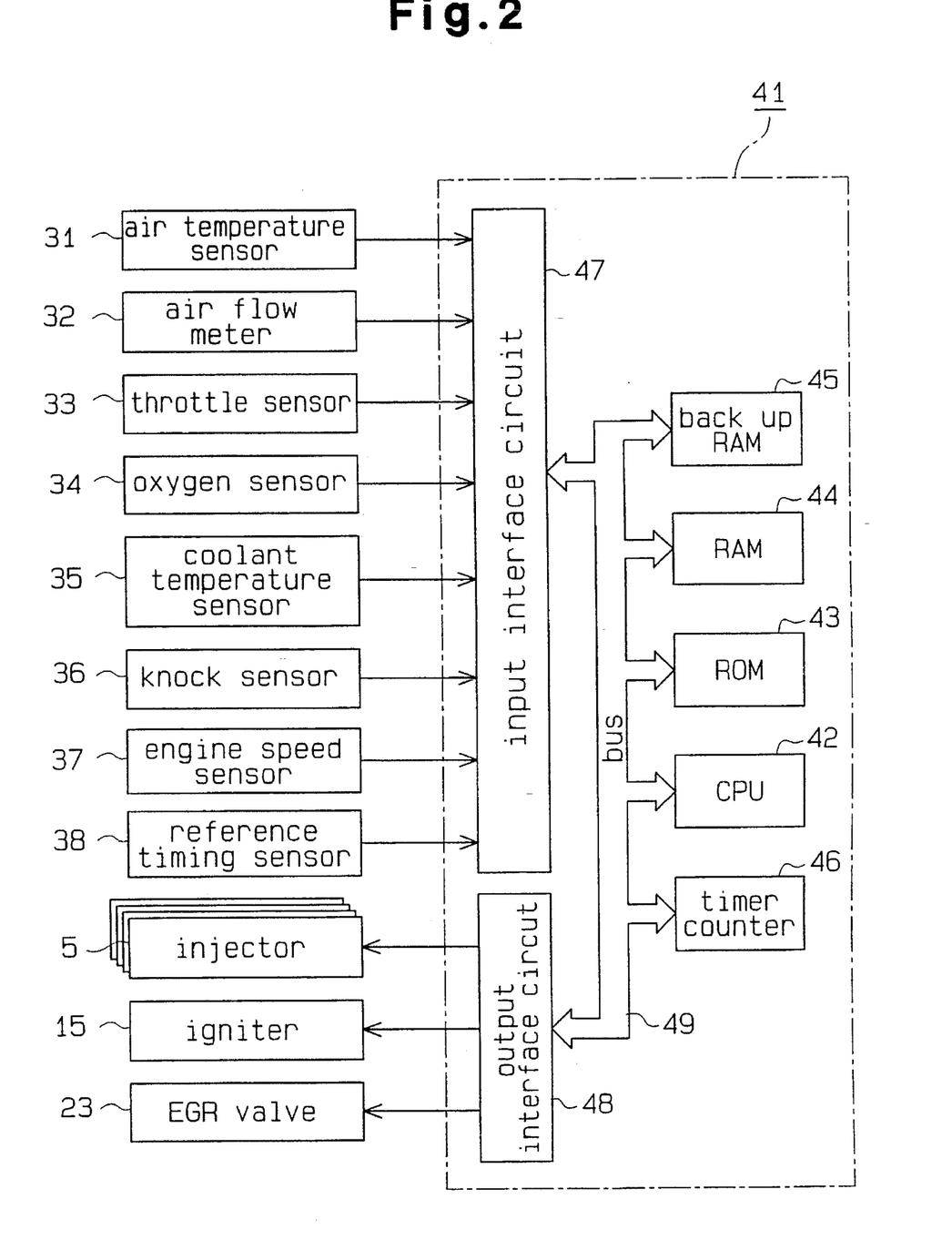
FIG. 2 is a block diagram showing the structures of an ECU (Electronic Control Unit) and other components.

As shown in the block diagram of FIG. 2, the ECU 41 comprises a central processing unit (CPU) 42, a read only memory (ROM) 43, a random access memory (RAM) 44, a backup RAM 45 and a timer counter 46. The ECU 41 has those components 42 to 46 connected to an input interface circuit 47 and an output interface circuit 48 by a bus 49, thus constituting an arithmetic logic unit. Predetermined control programs and the like are stored in the ROM 43. The RAM 44 temporarily stores the results of the operations performed by the CPU 42. The backup RAM 45 holds previously stored data. The timer counter 46 is capable of simultaneously performing a plurality of counting operations. The input interface circuit 47 includes a buffer, a wave shaper and an A/D converter. The output interface circuit 48 includes a driver. The individual sensors 31 to 38 are connected to the input interface circuit 47, and the components 5, 15 and 23 to the output interface circuit 48.

The CPU 42 reads the signals from the sensors 31–38, sent via the input interface circuit 47, as input values. Based on the input values, the CPU 42 properly controls the driving of the individual components 5, 15, 23 and so forth to execute various controls, such as the fuel injection control including air-fuel ratio control, the ignition timing control including knock control and EGR control. Further connected to the ECU 41 is a battery (not shown) which is mounted in a vehicle to be driven by the engine. The control of the individual components 5, 15, 23, etc., by the CPU 42 includes the control of the power supply to those components from the battery.

The fuel injection control referred to herein means the control of the amount of fuel to be injected from the individual injectors 5 in accordance with the running condition of the engine 1. The air-fuel ratio control means adjustment of the air-fuel ratio in the combustion chamber 1c based on the detected value from at least the oxygen sensor 34. The ignition timing control controls the ignition timing of the air-fuel mixture in each combustion chamber 1c by controlling the driving of the igniter 15 in accordance with the running condition of the engine 1 to activate each ignition plug 7. The knock control controls the occurrence of knocking by determining if knocking has occurred based on the detected value from the knock sensor 36 and controlling the ignition timing based on the result. Finally, the EGR control adjusts the EGR amount by controlling the opening of the EGR valve 23 in accordance with the running condition of the engine 1.

Of those various controls which are executed by the ECU 41, the procedures of the EGR control, the ignition timing control and the like will be discussed with reference to various flowcharts shown in FIGS. 3 through 10. The control programs associated with various routines to be described later and function data are previously stored in the ROM 43.

Figure 3:
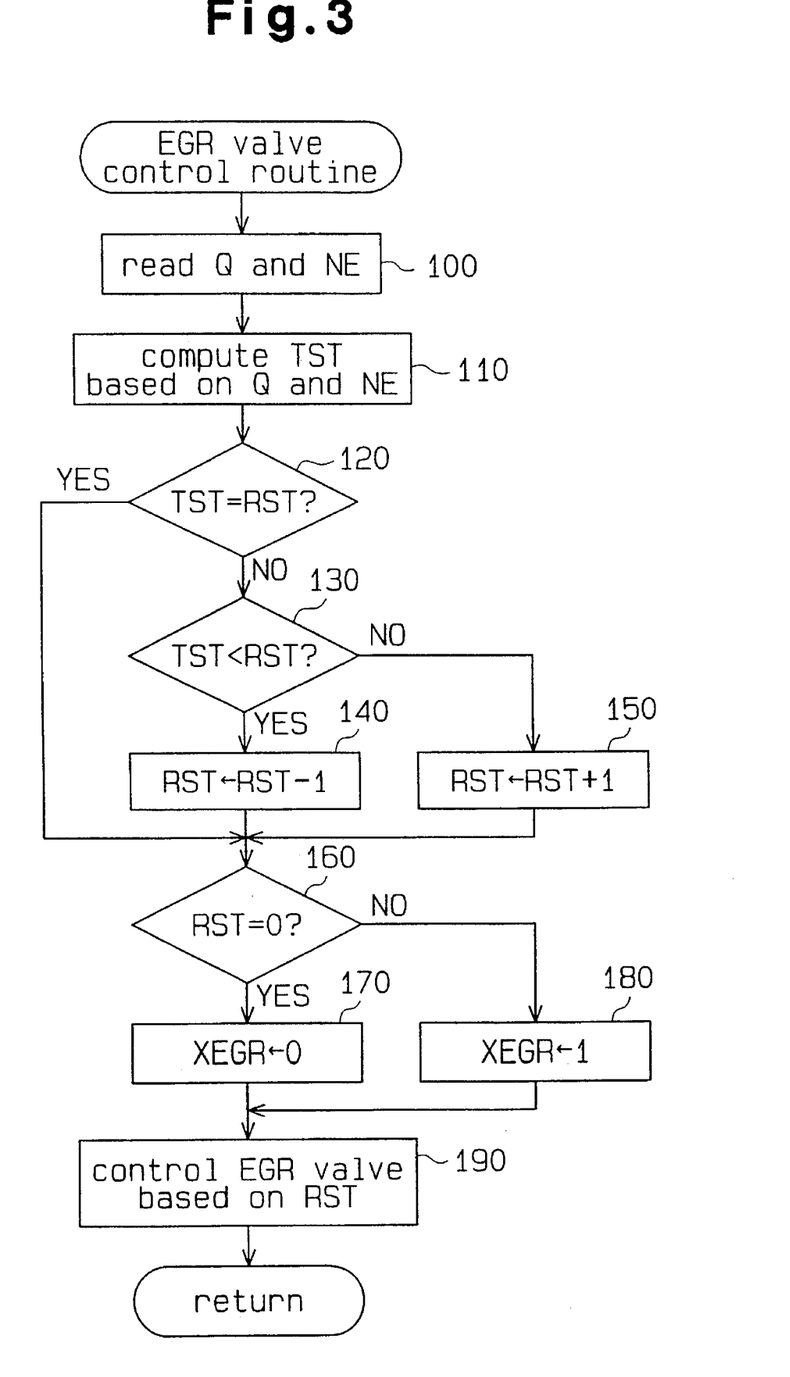
FIG. 3 is a flowchart illustrating an "EGR valve control routine"

FIG. 3 illustrates an "EGR valve control routine" for the EGR control. The ECU 41 executes this routine at predetermined times. When entering this control routine, the ECU 41 reads the values of the intake air amount Q and the engine speed NE based on the detection signals from the sensors 32 and 37 at step 100.

At step 110, the ECU 41 computes the value of the target angle, TST, of the EGR valve 23 based on the values of the currently read parameters Q and NE. Previously stored in the ROM 43 is function data (not shown) indicating the value of the target angle TST for both parameters Q and NE. The ECU 41 uses the function data to compute the value of the target angle TST.

At step 120, the ECU 41 determines if the value of the target angle TST computed in the previous step is equal to the value of a variable RST associated with the actual angle of the EGR valve 23. When the values TST and RST match with each other, the ECU 41 proceeds to step 160. When the values TST and RST are different from each other, the ECU 41 proceeds to step 130.

At step 130, the ECU 41 compares the value of the target angle TST with the value of the variable RST. When the value of the target angle TST is less than the value of the variable RST, the ECU 41 decrements the value of the variable RST by "1" at step 140. When the value of the target angle TST is equal to or greater than the value of the variable RST, the ECU 41 increments the value of the variable RST by "1" at step 150.

In the sequence of processes consisting of the aforementioned steps 100 to 150 in this embodiment, the ECU 41 computes the value of the variable RST that reflects the recirculation amount of the exhaust gas (EGR amount) to be achieved in accordance with the running condition of the engine 1.

At step 160, subsequent to step 120, 140 or 150, the ECU 41 determines whether or not the currently computed value of the variable RST is zero. When the value of the variable RST is zero, which means the EGR valve 23 is closed or EGR is inhibited, the ECU 41 sets an execution flag XEGR to zero at step 170. When the value of the variable RST is not zero, which means the EGR valve 23 is open or EGR is permitted, the ECU 41 sets the execution flag XEGR to one at step 180. The ECU 41 temporarily stores the set content of the execution flag XEGR into the RAM 44. The ECU 41 uses this execution flag XEGR in an "ignition timing computing routine" in FIG. 4, which will be described later. Thus, in the sequence of steps 160 to 180, the ECU 41 computes the execution flag XEGR to specify the permission or inhibition of EGR based on the value of the variable RST that reflects the EGR amount.

At step 190, subsequent to the aforementioned step 170 or 180, the ECU 41 controls the EGR valve 23 based on the currently obtained variable RST, and then temporarily terminates the subsequent processing. That is, the ECU 41 controls the EGR apparatus 21 to acquire the EGR amount that matches with the running condition of the engine 1.

When the value of the variable RST indicating the actual valve angle is greater than the value of the target angle TST, therefore, the ECU 41 performs control to close the EGR valve 23 in this routine. When the value of the variable RST is not greater than the value of the target angle TST, the ECU 41 performs control to open the EGR valve 23. When both values RST and TST are equal to each other, the ECU 41 controls the EGR valve 23 to maintain the angle. It is apparent that the ECU 41 controls the EGR amount by adjusting the opening of the EGR valve 23 in accordance with the running condition of the engine 1.

When the engine 1 is accelerating, is idling after the warming up, the ECU 41 may perform control to close the EGR valve 23 based on the value of the coolant temperature THW.

Figure 4:
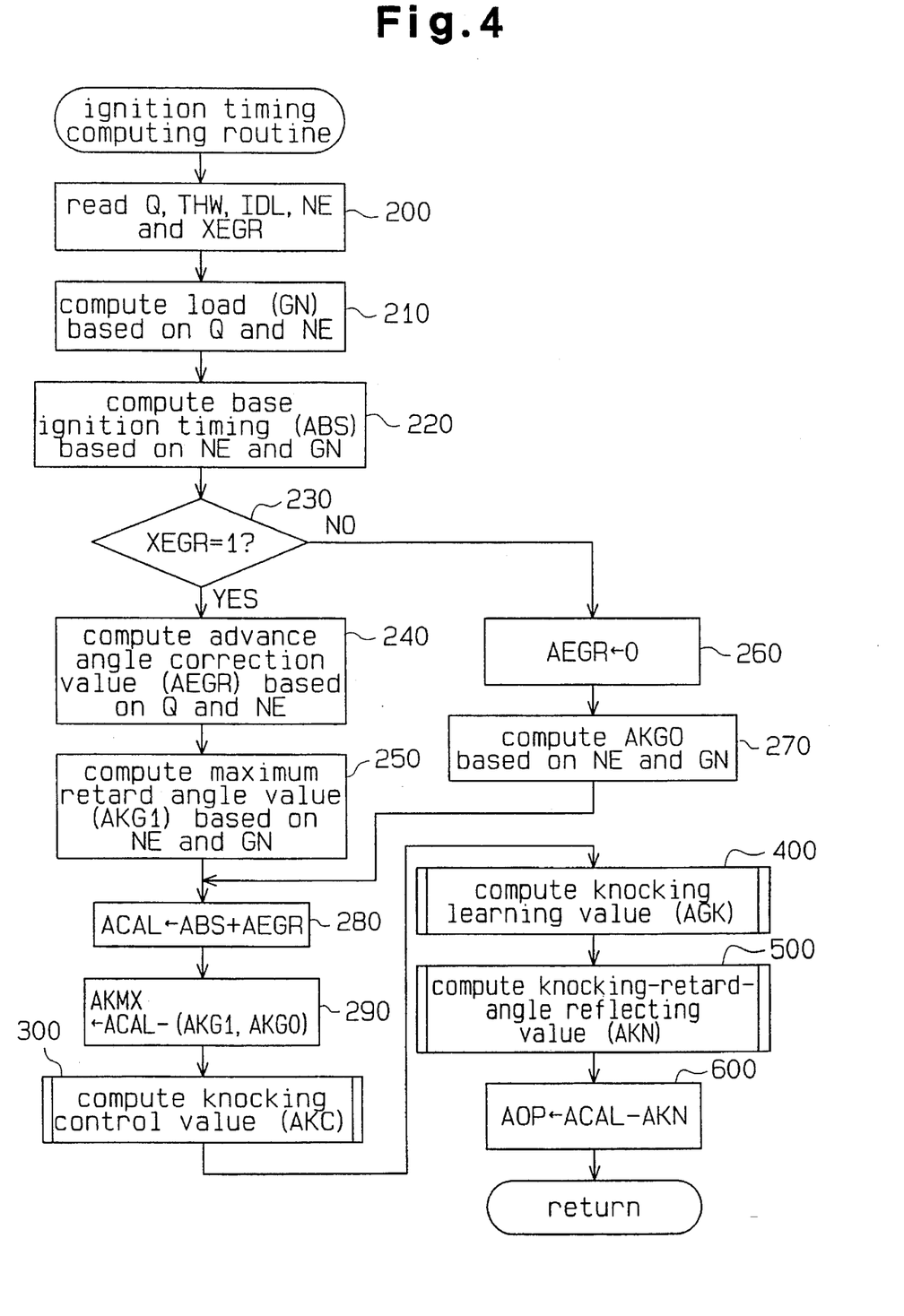
FIG. 4 is a flowchart illustrating an "ignition timing computing routine"

FIG. 4 illustrates the aforementioned "ignition timing computing routine" for the ignition timing control including knock control, which is executed in association with the above-described EGR control. The ECU 41 periodically executes this routine at predetermined times.

When entering this routine, at step 200, the ECU 41 reads the values of the intake air amount Q, idle signal IDL, coolant temperature THW and engine speed NE based on the detection signals from the sensors 32, 33, 35, 36 and 37. In addition, the ECU 41 reads the value of the execution flag XEGR associated with the EGR control from the RAM 44.

At step 210, the ECU 41 computes the load GN of the engine 1 based on the values of the currently read parameters Q and NE.

At step 220, the ECU 41 then computes the value of a base ignition timing ABS based on the values of the engine speed NE and the load GN. Function data (not shown) indicating the value of the base ignition timing ABS with respect to the values of both parameters NE and GN is previously stored in the ROM 43. The ECU 41 calculates the value of the base ignition timing ABS using this function data.

At step 230, the ECU 41 determines if the execution flag XEGR associated with the EGR control is one or if EGR is being performed. When the execution flag XEGR is one in this step 230, i.e., when EGR is being performed, the ECU 41 computes an advance angle correction value AEGR according to the EGR amount based on the read values of the parameters Q and NE at step 240. Function data (not shown) indicating the value of the advance angle correction value AEGR with respect to both parameters Q and GN is previously stored in the ROM 43. The advance angle correction value AEGR in the function data is set to be small when the engine 1 is running slow with a small load or is in a high-load state and to be large when the engine 1 is running at a middle speed with a middle load. The ECU 41 calculates the advance angle correction value AEGR using this function data. Generally, the combustion speed of the air-fuel mixture in each combustion chamber 1c becomes slower as EGR is executed. The ECU 41 computes the advance angle correction value AEGR to advance the ignition timing in order to deal with this problem.

At step 250, the ECU 41 computes a maximum retard angle value AKG1 (absolute value) associated with knock control based on the current values of the engine speed NE and the load GN. More specifically, the ECU 41 calculates the value of the maximum retard angle value AKG1 using function data (not shown) indicating the value of the maximum retard angle value AKG1 with respect to the values of both parameters NE and GN, which is previously stored in the ROM 43.

When the execution flag XEGR is zero at step 230, i.e., when EGR is stopped, the ECU 41 sets the advance angle correction value AEGR to zero at step 260.

At step 270, the ECU 41 computes a maximum retard angle value AKG0 (absolute value) based on the current values of the engine speed NE and the load GN. More specifically, the ECU 41 calculates the value of the maximum retard angle value AKG0 using function data previously stored in the ROM 43, as at step 250.

The maximum retard angle values AKG1 and AKG0 are limit values when the ignition timing is retarded by the knock control. When EGR is executed, the temperature of the air-fuel mixture generally rises, making knocking more likely. The maximum retard angle value AKG1 with EGR in action is set to be more retarded than the maximum retard angle value AKG0 with EGR disabled.

At step 280, subsequent to 250 or 270, the ECU 41 adds the value of the advance angle correction value AEGR to the value of the base ignition timing ABS to compute the value of a demanded ignition timing ACAL.

At step 290, the ECU 41 subtracts the maximum retard angle value AKG1 or AKG0 from the value of the demanded ignition timing ACAL to calculate a maximum value AKMX with respect to a knocking control value AKC. In this step, the ECU 41 computes a maximum value AKMX1 associated with the maximum retard angle value AKG1 and a maximum value AKMX0 associated with the maximum retard angle value AKG0.

Figure 5:
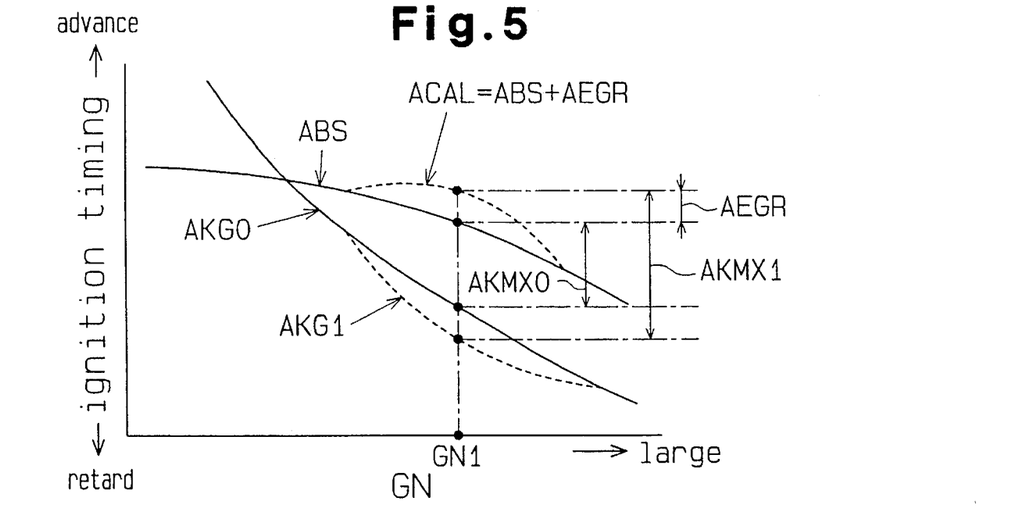
FIG. 5 is a graph showing the relation between various parameters and the load in association with the ignition timing.

FIG. 5 presents a graph showing the relationship among various parameters ABS, AEGR, ACAL, AKG1, AKG0, AKMX1 and AKMX0 with respect to a certain value GN1 of the load GN. This graph shows the relationship between those parameters and the load GN in the case where the engine speed NE is set to a given value. The relation actually shows the quadratic function data of the engine speed NE and the load GN.

Figure 6:
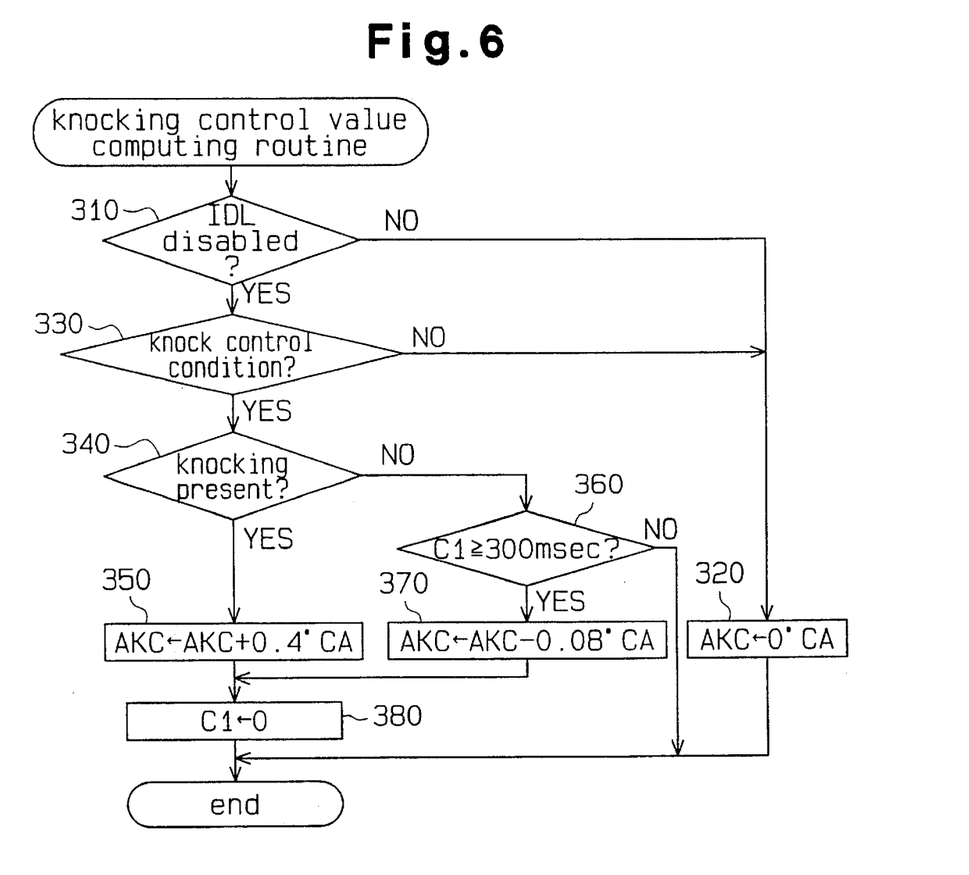
FIG. 6 is a flowchart illustrating a "knocking control value computing routine"

At step 300, the ECU 41 computes the knocking control value AKC for knock control in accordance with the a "knocking control value computing routine" shown in FIG. 6.

At step 310, the ECU 41 determines whether or not the idle signal IDL is enabled, i.e., whether or not the engine 1 is idling. The ECU 41 proceeds to step 330 when the engine 1 is in the normal running condition, and proceeds to step 320 when the engine 1 is idling.

At step 320 the ECU 41 sets the knocking control value AKC to zero degrees CA (crank angle) and stores it in the RAM 44 before terminating the routine in the step 300.

At step 330, the ECU 41 determines whether or not the running condition of the engine 1 satisfies the condition for knock control. This knock control condition is previously determined in association with the relation between the values of the engine speed NE and the load GN. When the running condition of the engine 1 does not meet the knock control condition, the ECU 41 executes the process at step 320 after which the routine in the step 300 is terminated. When the running condition of the engine 1 meets the knock control condition, the ECU 41 moves to step 340.

At step 340, the ECU 41 determines if knocking has occurred in the engine 1, based on the knock signal KCS. When knocking has occurred, the ECU 41 adds 0.4 degrees CA to the knocking control value AKC and sets the resultant value as a new knocking control value AKC. When there is no knocking, the ECU 41 proceeds to step 360.

At step 360, the ECU 41 determines if a count value C1 in the timer counter 46 is equal to or greater than 300 msec. When there is no knocking, the ECU 41 causes the timer counter 46 to count the count value C1 to advance the knocking control value AKC every given time.

When the count value C1 is less than 300 msec at step 360, the ECU 41 terminates the routine at step 300. When the count value C1 is equal to or greater than 300 msec, the ECU 41 subtracts 0.08 degrees CA from the knocking control value AKC and sets the resultant value as a new knocking control value AKC at step 370.

At step 380 as moved from step 350 or 370, the ECU 41 resets the count value C1 to zero and then terminates the routine at step 300.

Thereafter, the ECU 41 returns the processing to the ignition timing computing routine in FIG. 4 and computes a knocking learning value AGK for knock control at step 400. The ECU 41 calculates the knocking learning value AGK in accordance with a "knocking learning value computing routine" illustrated in FIG. 7.

Figure 7:
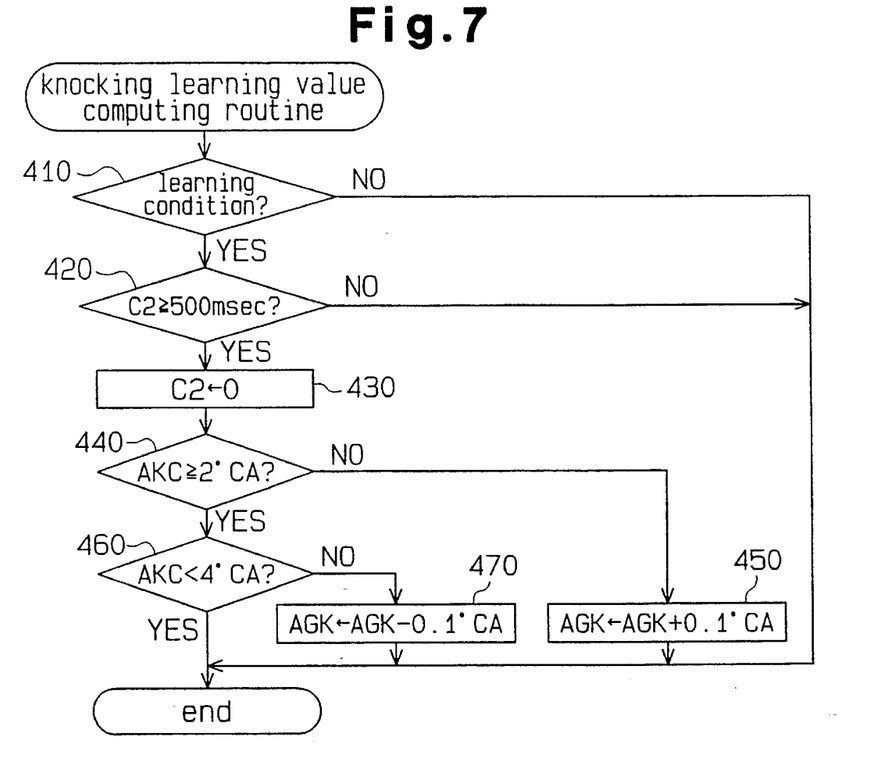
FIG. 7 is a flowchart illustrating a "knocking learning value computing routine"

At step 410, the ECU 41 determines if the running condition of the engine 1 satisfies the condition for learning knocking. This learning condition is predetermined in view of the relation between the engine speed NE and the load GN. When the running condition of the engine 1 does not meet the knocking learning condition, the ECU 41 terminates the routine at step 400. When the running condition of the engine 1 meets the knocking learning condition, on the other hand, the ECU 41 moves to step 420.

At step 420, the ECU 41 determines whether or not another count value C2 counted by the timer counter 46 is equal to or greater than 500 msec. To learn and renew the knocking learning value AGK every determined period, the ECU 41 causes the timer counter 46 to count this count value C2.

When the count value C2 is smaller than 500 msec at step 420, the ECU 41 terminates the routine at step 400. When the count value C2 is equal to or greater than 500 msec, however, at step 430 the ECU 41 resets the count value C2 to zero and then proceeds to step 440.

At step 440, the ECU 41 determines whether or not the knocking control value AKC computed in the routine at step 300 is equal to or greater than 2 degrees CA. When the knocking control value AKC is less than 2 degrees CA, the ECU 41 adds 0.1 degrees CA to the current knocking learning value AGK and sets the resultant value as a new knocking learning value AGK at step 450. Then, the ECU 41 terminates the routine at step 400.

When the knocking control value AKC is equal to or greater than 2 degrees CA at step 440, the ECU 41 determines whether or not the knocking control value AKC is less than 4 degrees CA at step 460. When the knocking control value AKC is equal to or greater than 4 degrees CA, the ECU 41 subtracts 0.1 degrees CA from the current knocking learning value AGK and sets the resultant value as a new knocking learning value AGK at step 470. Then, the ECU 41 terminates the routine at step 400. When the knocking control value AKC is smaller than 4 degrees CA, the ECU 41 terminates the routine at step 400.

A variation in the octane value of fuel, a variation in the characteristics of the engine 1 and a chronological change in the engine characteristics reflect on the knocking learning value AGK computed in the above manner. According to the routines in both steps 300 and 400, the knocking learning value AGK is learned and renewed based on the occurrence or non-occurrence of knocking in such a manner that the knocking control value AKC falls within the range of 2 to 4 degrees CA.

Thereafter, the ECU 41 returns the processing to the ignition timing computing routine in FIG. 4 and computes a value AKN reflecting the knocking retard angle (hereinafter called "knocking-retard-angle reflecting value"), which is used to execute knock control, at step 500. The ECU 41 calculates the reflecting value AKN in accordance with a "routine for computing a knocking-retard-angle reflecting value" illustrated in FIG. 8.

Figure 8:
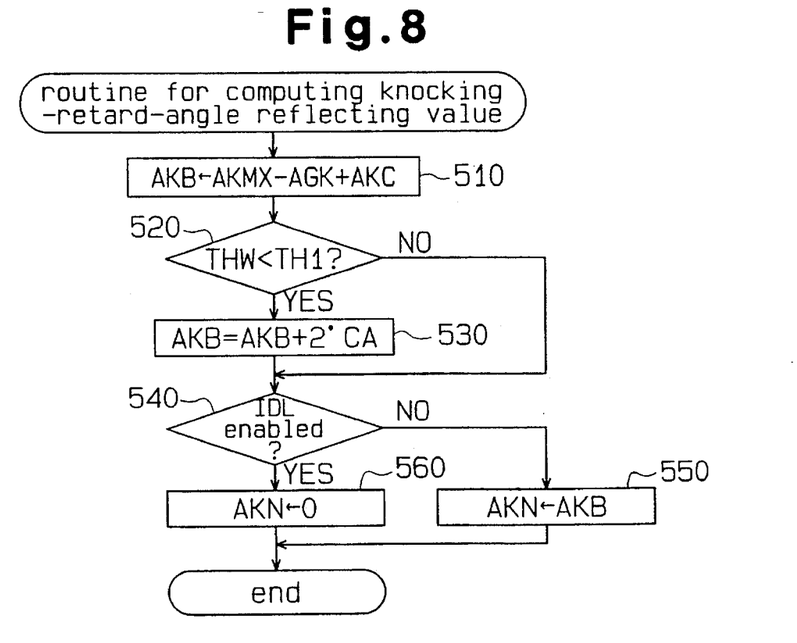
FIG. 8 is a flowchart illustrating a "routine for computing a knocking-retard-angle reflecting value"

At step 510, the ECU 41 computes a knocking retard angle value AKB based on the values of various parameters AKMX, AGK and AKC which have been computed in the previous steps 290, 300 and 400. More specifically, the ECU 41 computes the knocking retard angle value AKB from the following equation (1).

$$AKB = AKMX - AGK + AKC \quad (1)$$

The ECU 41 determines at step 520 whether or not the currently read value of the coolant temperature THW is lower than a predetermined reference value TH1. The ECU 41 makes this decision to determine if the engine 1 is in a cool state. Therefore, the reference value TH1 is previously set to the proper value for the determination (e.g., 60 degrees C.). When the value of the coolant temperature THW is not lower than the reference value TH1, the ECU 41 proceeds to step 540. When the value of the coolant temperature THW is lower than the reference value TH1, the ECU 41 adds 2 degrees CA to the currently computed knocking retard angle value AKB to correct the knocking retard angle value AKB at step 530. When the engine 1 is in the cool state, the ECU 41 does not perform feedback knocking control based on the detection signal from the knock sensor 36, so that the reliability of the knocking learning value AGK may be reduced. Accordingly, the ECU 41 corrects the knocking learning value AGK in such a manner that the knocking learning value AGK is more retarded by 2 degrees CA.

At step 540 as moved from step 520 or 530, the ECU 41 determines if the idle signal IDL is enabled or if the engine 1 is idling. When the engine 1 is in the normal running condition, the ECU 41 sets the knocking retard angle value AKB, computed at step 530, as the reflecting value AKN at step 550, and then terminates the routine at step 500. When the engine 1 is idling, the ECU 41 sets the knocking-retard-angle reflecting value AKN to zero and then terminates the routine at step 500.

Thereafter, the ECU 41 returns the processing to the ignition timing computing routine in FIG. 4 and computes the value of an output ignition timing AOP, which is used for the ignition timing control, at step 600 based on the parameters ACAL and AKN computed at steps 280 and 500. The ECU 41 calculates the value of this output ignition timing AOP from the following equation (2).

$$AOP = ACAL = AKN \quad (2)$$
$$= ABS + AEGR - AKMX + AGK - AKC$$

Figure 9:
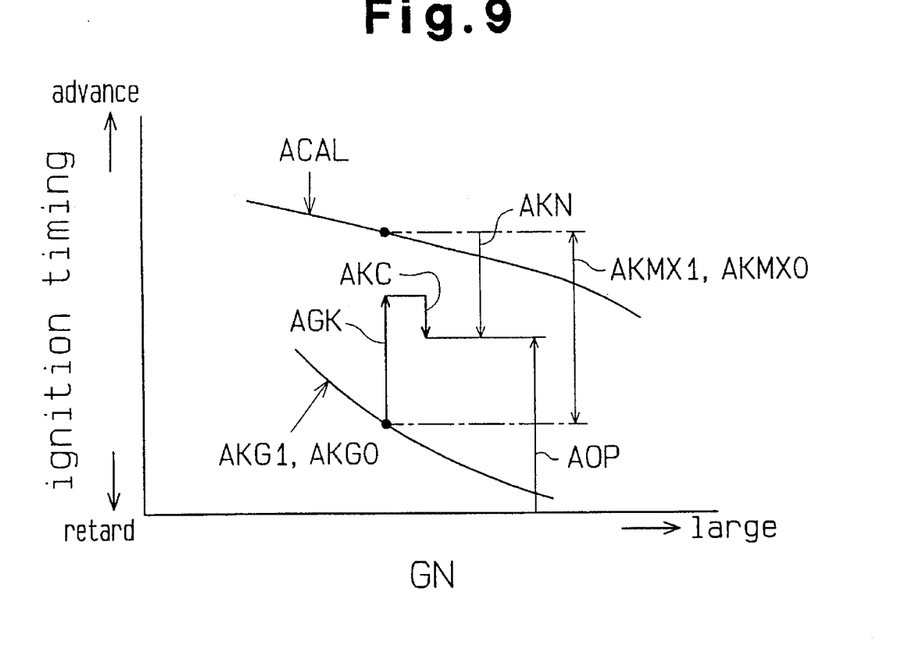
FIG. 9 is a graph showing the relation between various parameters and the load in association with the ignition timing.
Figure 10:
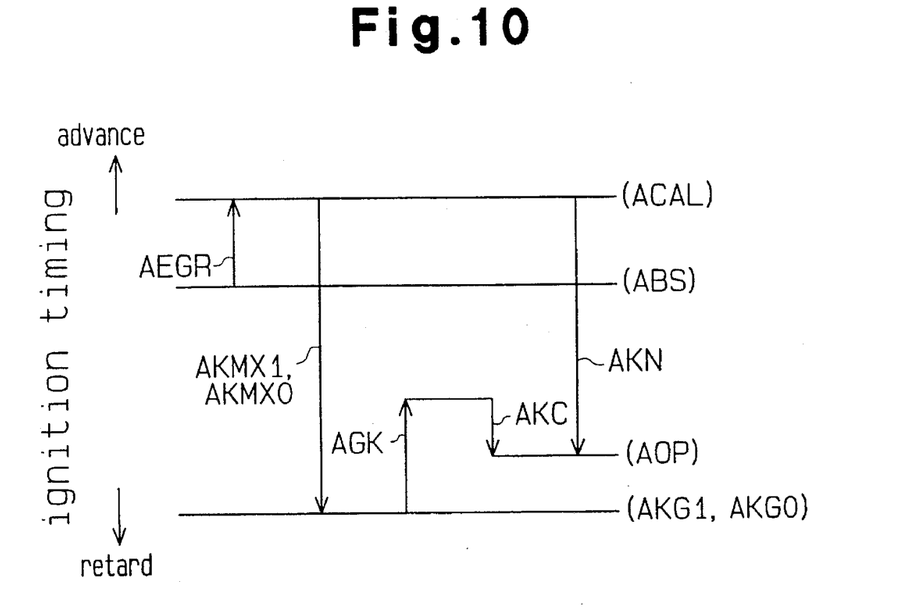
FIG. 10 is a graph showing the relation among various parameters associated with the ignition timing.

In other words, the output ignition timing AOP is a timing value that is more retarded than the target ignition timing ACAL, as shown in FIGS. 9 and 10. After the execution of the process at step 600, the ECU temporarily terminates the subsequent processing.

After the computation of the output ignition timing AOP for the ignition timing control in the above-described manner, the ECU 41 controls the igniter 15 based on the computed output ignition timing AOP in accordance with another routine. As a result, the individual ignition plugs 7 are activated to ignite the air-fuel mixtures in the combustion chambers 1c. That is, the ECU 41 outputs data associated with the ignition timing control. As the output processing is well known art, its description will not be given.

According to the ignition timing control apparatus of this invention, as described above, the ECU 41 computes the base ignition timing ABS in accordance with the running condition of the engine 1. The ECU 41 computes the demanded ignition timing ACAL by correcting the value of the base ignition timing ABS toward advancement based on the desired advance angle correction value AEGR, which is computed in accordance with the EGR amount. The ECU 41 computes the value of the final output ignition timing AOP by correcting the demanded ignition timing ACAL, toward retard, to the timing near the limit at which knocking starts, based on the desired reflecting value AKN. Based on the value of the output ignition timing AOP, the ECU 41 controls the igniter 15 to control the ignition timing for the air-fuel mixture in each combustion chamber 1c.

As a result, the actual ignition timing is adjusted to in the vicinity of the limit beyond which knocking occurs, so that the engine 1 can provide the maximum output torque that matches with the running condition of the engine 1 at that time. In addition, since the actual ignition timing is corrected based on the advance angle correction value AEGR according to the EGR amount, the combustion of the air-fuel mixture in each combustion chamber 1c is not retarded by EGR.

As shown in FIGS. 9 and 10, the ECU 41 computes the maximum retard angle values AKG1 and AKG0 or the maximum values of the retard angle value associated with the timing close to the limit beyond which knocking starts, in accordance with the running condition of the engine 1. The ECU 41 selectively uses those maximum retard angle values AKG1 and AKG0 in accordance with whether or not EGR is performed and in accordance with a difference in EGR amount. Further, the ECU 41 computes the knocking control value AKC and the knocking learning value AGK based on the detection signal from the knock sensor 36. The ECU 41 limits the reflecting value AKN within the range defined by the maximum retard angle values AKG1 and AKG0 by correcting the maximum retard angle values AKG1 and AKG0 based on the knocking control value AKC and the knocking learning value AGK.

When no EGR is performed in the engine 1, therefore, the actual ignition timing is accordingly corrected to the timing close to the limit beyond which knocking starts. When EGR is carried out in the engine 1, on the other hand, the actual ignition timing is accordingly corrected to the timing close to the limit beyond which knocking starts, on the assumption that the actual ignition timing is corrected toward advancement by the advance angle correction value AEGR. The ignition timing is not advanced more than necessary regardless of a difference in the running condition of the engine 1.

Accordingly, the setting of the ignition timing toward advancement is suppressed irrespective of the execution or non-execution of EGR in order to provide the maximum output torque from the engine 1 by retarding the ignition timing close to the limit beyond which knocking starts. This approach prevents undesired knocking from occurring. Particularly, this embodiment retards or advances the ignition timing in accordance with a difference in EGR amount. It is therefore possible to correct the ignition timing more precisely regardless of a difference in EGR amount and to prevent the occurrence of undesired knocking with a high degree of accuracy.

Although only one embodiment of the present invention has been described herein, it should be apparent to those skilled in the art that the present invention may be embodied in many other specific forms without departing from the spirit or scope of the invention. Particularly, it should be understood that this invention may be embodied in the following forms in which like or the same action and advantages as those of the above-described embodiment can be obtained.

Figure 11:
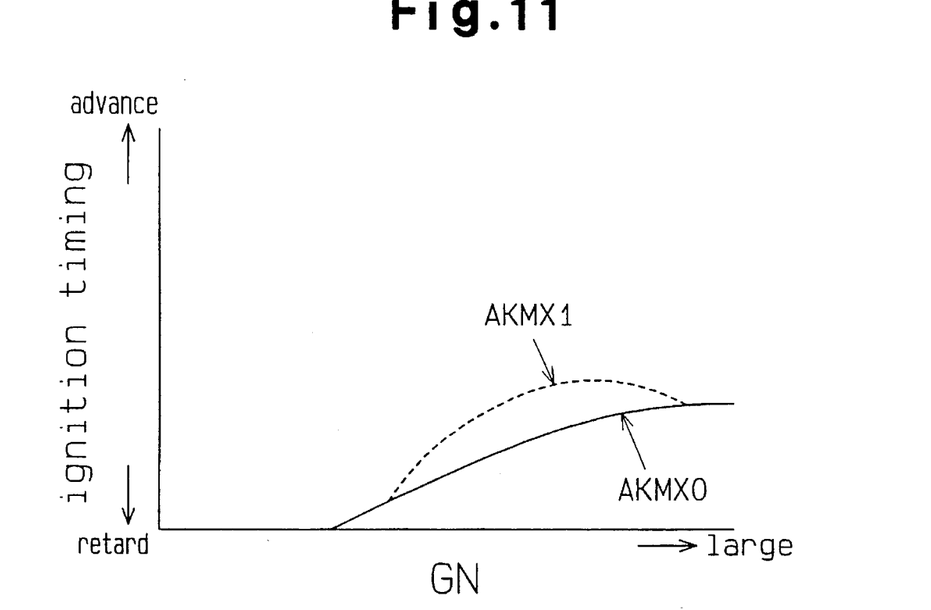
FIG. 11 is a graph showing the relation between the maximum value of the retard angle and the load in association with the ignition timing.

In the above-described embodiment, the maximum retard angle values AKG1 and AKG0 are computed as absolute values at steps 250 and 270 in FIG. 4, and the maximum value AKMX (AKMX1, AKMX0) is computed based on the maximum retard angle values AKG1 and AKG0 at step 290. However, the maximum retard angle values AKG1 and AKG0 may be set as relative values from quadratic function data at steps 250 and 270 in FIG. 4. Alternatively, the steps 250 and 270 in FIG. 4 may be omitted and the maximum value AKMX (AKMX1, AKMX0) may be computed instead at step 290, based on the function data shown in FIG. 11 and in accordance with whether EGR is enabled or disabled.

Figure 12:
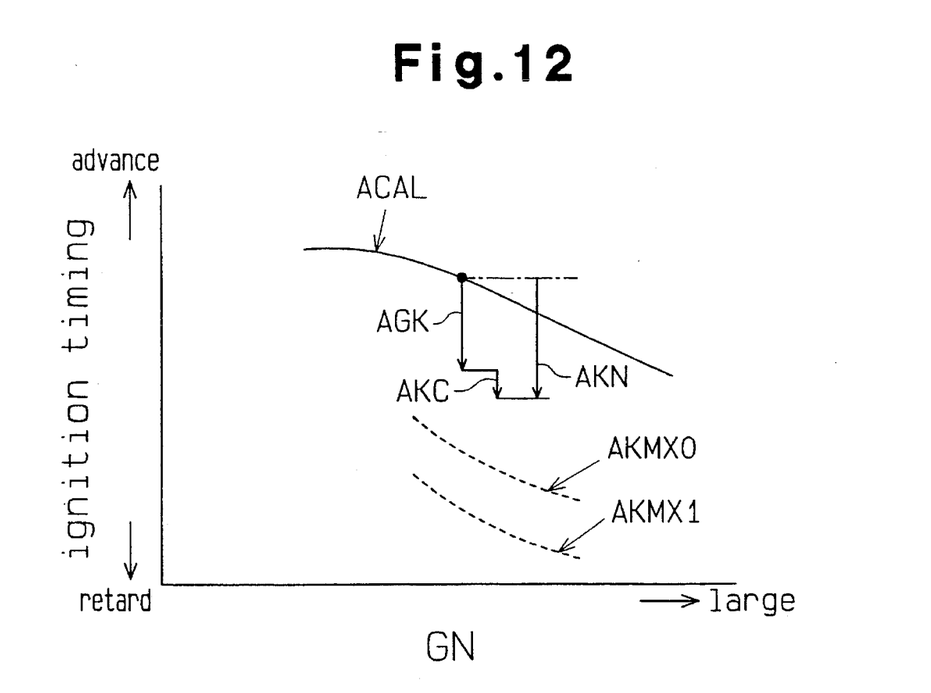
FIG. 12 is a graph showing the relation between various parameters and the load in association with the ignition timing.

In the above-described embodiment, the knocking learning value AGK is set as a value which changes toward advancement from the maximum retard angle values AKG1 and AKG0, as shown in FIGS. 9 and 10. Alternatively, the knocking learning value AGK may be set as a value which changes toward retard from the demanded ignition timing ACAL as shown in FIG. 12. In this case, the processes at steps 400, 500 and 600 in FIG. 4 are to be replaced with the desired processes. It should however be noted that the reflecting value AKN is limited to a value equal to or smaller than the maximum value AKMX (AKMX1, AKMX0) at step 500.

Although the ignition timing control apparatus of this invention is adapted for use in the engine 1 of a "luft menge messer system" which uses the air flow meter 32, it may also be adapted for an engine of the "druck menge messer system" which uses a vacuum sensor.

While the control apparatus of this invention is adapted for a gasoline engine in the above-described embodiment, this control apparatus may also be adapted for an LPG engine.

Therefore, the present examples and embodiment are to be considered as illustrative and not restrictive and the invention is not to be limited to the details given herein, but may be modified within the scope of the appended claims.

What is claimed is:

1. An apparatus for controlling an ignition timing in an internal combustion engine, the apparatus having a first device for igniting a combustible mixture introduced to a combustion chamber through an intake passage at an ignition timing selected in response to operation conditions of the engine and a second device capable of recirculating exhaust gas exhausted from the combustion chamber to an exhaust passage back to the mixture, wherein the apparatus corrects the ignition timing when the exhaust gas is recycled to the mixture, said apparatus comprising:

first detecting means for detecting the operation conditions including at least a rotational speed of the engine and an operation load of the engine;

first computing means for computing the ignition timing based on the detected operation conditions;

first correcting means for correcting the computed ignition timing with an advance value in accordance with an occurrence of the recirculating of the exhaust gas;

second detecting means for detecting an occurrence of a knocking in the combustion chamber;

second correcting means for correcting the ignition timing corrected by the first correcting means with a specific retard value to a timing close to a limit beyond which the knocking starts;

control means for controlling the first device based on the ignition timing corrected by the second correcting means;

second computing means for computing a maximum retard value employed for the correction of the second correcting means based on the detected operation conditions;

confining means for confining the ignition timing corrected by the second correcting means within a limit of the computed maximum retard value; and varying means for varying one of the specific retard value employed in the correction of the second correcting means and the maximum retard value computed by the second computing means in accordance with the occurrence of the recirculating of the exhaust gas.

2. The apparatus as set forth in claim 1 further comprising:

third computing means for computing the advance value in accordance with an amount of the recirculating of the exhaust gas based on the operation conditions detected by the first detecting means; and said first correcting means corrects the ignition timing with the computed advance value.

3. The apparatus as set forth in claim 1 further comprising:

fourth computing means for computing a first value which defers the ignition timing to a timing close to a limit beyond which the knocking starts based on the occurrence of the knocking detected by the second detecting means;

learning means for learning a second value to correct the ignition timing so as to confine the first value within a predetermined range; and fifth computing means for the specific retard value employed in the correction of the second correcting means based on the computed first value and the learned second value.

4. The apparatus as set forth in claim 1, wherein said first device includes:

an ignition plug disposed in the combustion chamber; and an igniter for supplying high voltage to the ignition plug.

5. The apparatus as set forth in claim 1, wherein said second device includes:

a passage for leading the exhaust gas from the exhaust passage to the intake passage; and a control valve for controlling an amount of the exhaust gas flowing the leading passage.

6. The apparatus as set forth in claim 1, wherein said first detecting means includes:

a first sensor for detecting a rotational speed of the engine; and a second sensor for detecting an amount of air introduced into the combustion chamber from the intake passage.

7. The apparatus as set forth in claim 1, wherein said second detecting means includes a knock sensor for detecting vibrations caused by the operation conditions of the engine including the knocking occurred in the combustion chamber.

8. The apparatus as set forth in claim 1 further comprising an electronic control unit, wherein said electronic control unit includes an input signal processing circuit, a computing circuit and an output signal circuit to form said first computing means, said second computing means, said first correcting means, said second correcting means, said control means, said confining means and said varying means.

9. An apparatus for controlling an ignition timing in an internal combustion engine, which has a first device for igniting a combustible mixture introduced to a combustion chamber through an intake passage at an ignition timing responsive to operation conditions of the engine and a second device capable of recirculating exhaust gas caused by igniting of the mixture and exhausted from the combustion chamber to an exhaust passage back to the mixture and correcting the ignition timing when the exhaust gas is recycled to the mixture, said apparatus comprising:

a first sensor for detecting a rotational speed of the engine;

a second sensor for detecting an amount of the air introduced to the combustion chamber through the intake passage;

first computing means for computing an operation load of the engine based on the detected rotational speed and the detected amount of the air;

second computing means for computing the ignition timing based on the detected rotational speed and the computed operation;

first correcting means for correcting the computed ignition timing with an advance value in accordance with an occurrence of the recirculating of the exhaust gas;

a knock sensor for detecting a vibration including a knocking occurred in the combustion chamber, said knock sensor being arranged to output signal in response to a level of the vibration;

second correcting means for correcting the ignition timing corrected by the first correcting means with a specific retard value to a timing close to a limit beyond which the knocking starts in response to the signal from the knock sensor;

control means for controlling the first device based on the ignition timing corrected by the second correcting means;

third computing means for computing a maximum retard value employed for the correction of the second correcting means based on the detected rotational speed and the detected amount of the air;

confining means for confining the ignition timing within the range including the maximum retard value as one of limitation values; and varying means for varying one of the specific retard value employed in the correction of the second correcting means and the maximum retard value computed by the third computing means in accordance with the occurrence of the recirculating of the exhaust gas.

10. The apparatus as set forth in claim 9 further comprising:

fourth computing means for computing the advance value in accordance with an amount of the recirculating of the exhaust gas based on the rotational speed detected by the first sensor and the amount of the air detected by the second sensor; and said first correcting means corrects the ignition timing with the computed advance value.

11. The apparatus as set forth in claim 9 further including:

fifth computing means for computing a first value which defers the ignition timing in response to the signal from the knock sensor to a timing close to a limit beyond which the knocking starts;

learning means for learning a second value to correct the ignition timing so as to confine the first value within a predetermined range; and sixth computing means for computing the retard value employed in the correction of the second correcting means based on the computed first value and the learned second value.

12. The apparatus as set forth in claim 9 further including:

an ignition plug disposed in the combustion chamber; and an igniter for supplying high voltage to the ignition plug.

13. The apparatus as set forth in claim 9 further including:

a passage for leading the exhaust gas from the exhaust passage to the intake passage; and a control valve for controlling an amount of the exhaust gas flowing in the leading passage.

14. The apparatus as set forth in claim 9 further including:

an electronic control unit, wherein said electronic control unit includes an input signal processing circuit, a computing circuit and an output signal circuit to form said first computing means, said second computing means, said third computing means, said first correcting means, said second correcting means, said control means, said confining means and said varying means.

15. An apparatus for controlling an ignition timing in an internal combustion engine, which has a first device for igniting a combustible mixture introduced to a combustion chamber through an intake passage at an ignition timing responsive to operation conditions of the engine and a second device capable of recirculating exhaust gas caused by igniting of the mixture and exhausted from the combustion chamber to an exhaust passage back to the mixture and correcting the ignition timing when the exhaust gas is recycled to the mixture, said apparatus comprising:

a first sensor for detecting a rotational speed of the engine;

a second sensor for detecting an amount of the air introduced to the combustion chamber through the intake passage;

first computing means for computing an operation load of the engine based on the detected rotational speed and the detected amount of the air;

second computing means for computing the ignition timing based on the detected rotational speed and the computed operation load of the engine;

determining means for determining an occurrence of recirculating of the exhaust gas;

third computing means for computing an advance value required in accordance with an amount of the recirculating of the exhaust gas based on the detected rotational speed and the detected air amount when said determining means determines the occurrence of the recirculating of the exhaust gas;

first correcting means for obtaining a first corrected ignition timing by correcting the computed ignition timing with the computed advance value when said determining means determines the occurrence of the exhaust gas, and maintaining the computed ignition timing unless said determining means determines the occurrence of the recirculating of the exhaust gas;

a knock sensor for detecting a vibration occurred in the engine including knocking, said knock sensor being arranged to output a signal responsive to a level of the vibration;

fourth computing means for computing a first value which defers the ignition timing to a timing to a limit beyond which the knocking starts in response to the signal from the knock sensor;

learning means for learning a second value to correct the ignition timing so as to confine the first value within a predetermined range;

fifth computing means for computing a retard value based on the computed first value and the learned second value;

second correcting means for obtaining a second corrected ignition timing by correcting the obtained first corrected ignition timing with a retard value computed by the fifth computing means to a timing close to a limit beyond which the knocking starts;

control means for controlling the first device based on the second corrected ignition timing;

sixth computing means for computing a first maximum retard value employed for the correction of the second correcting means based on the detected rotational speed and the computed operation load when the determining means determines the occurrence of the recirculating of the exhaust gas;

seventh computing means for computing a second maximum retard value which is advanced with respect to the first maximum retard value based on the detected rotational speed and the computed operation load unless said determining means determines the occurrence of the recirculating of the exhaust gas;

first confining means for confining the second corrected ignition timing within a limit of the first maximum retard value when said determining means determines the occurrence of the recirculating of the exhaust gas; and second confining means for confining the second corrected ignition timing within a limit of the second maximum retard value unless said determining means determines the occurrence of the recirculating of the exhaust gas.

16. The apparatus as set forth in claim 15 further comprising:

an ignition plug disposed in the combustion chamber; and an igniter for supplying high voltage to the ignition plug.

17. The apparatus as set forth in claim 15 further comprising:

a passage for leading the exhaust gas from the exhaust passage to the intake passage; and a control valve for controlling an amount of the exhaust gas flowing in the leading passage.

18. The apparatus as set forth in claim 15 further comprising:

an electronic control unit, wherein said electronic control unit includes an input signal processing circuit, a computing circuit and an output signal circuit to form said first computing means, said second computing means, said third computing means, said fourth computing means, said fifth computing means, said first correcting means, said second correcting means, said control means, said first confining means and said confining means.

* * * * *